United States Patent Office 3,320,111
Patented May 16, 1967

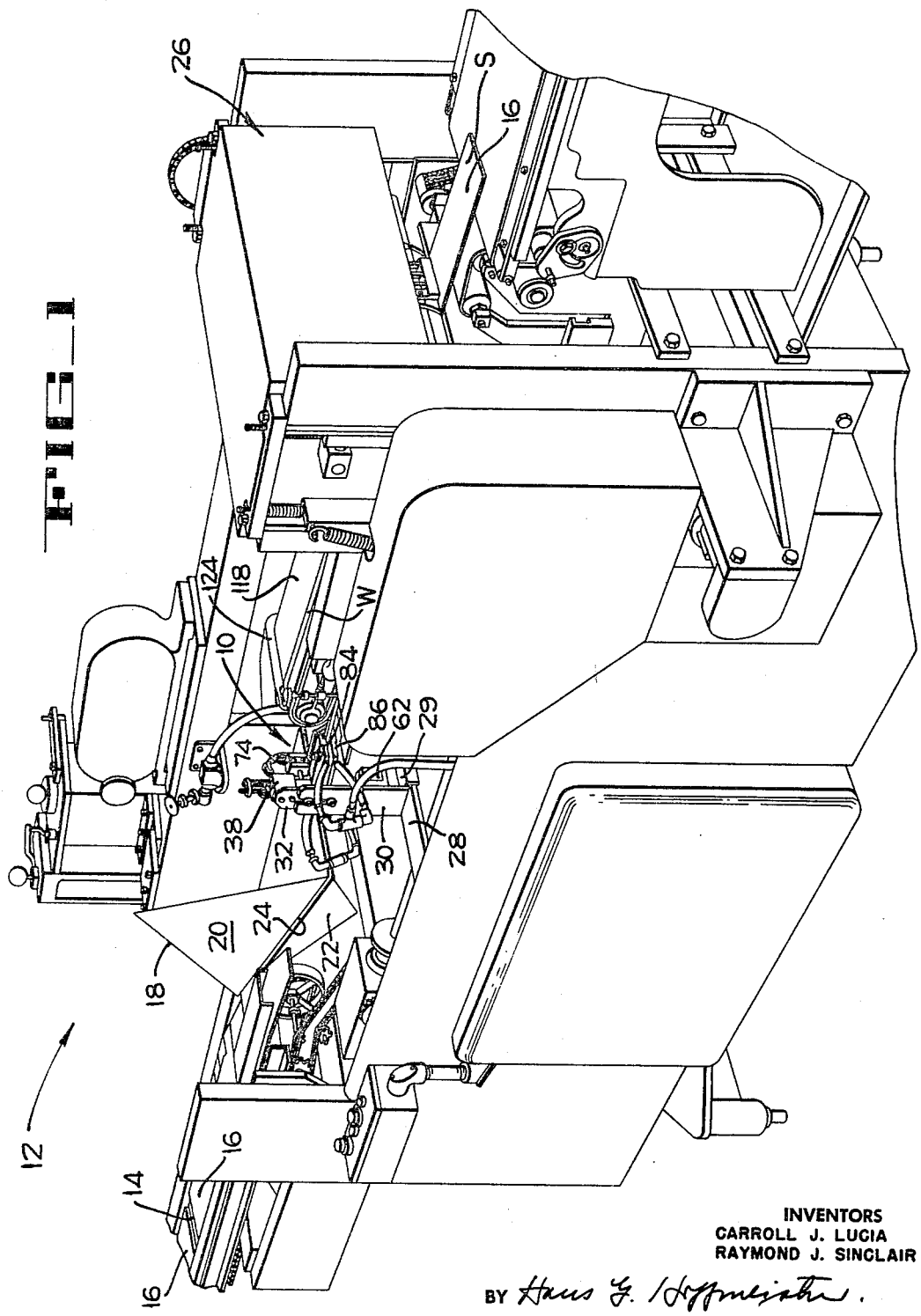

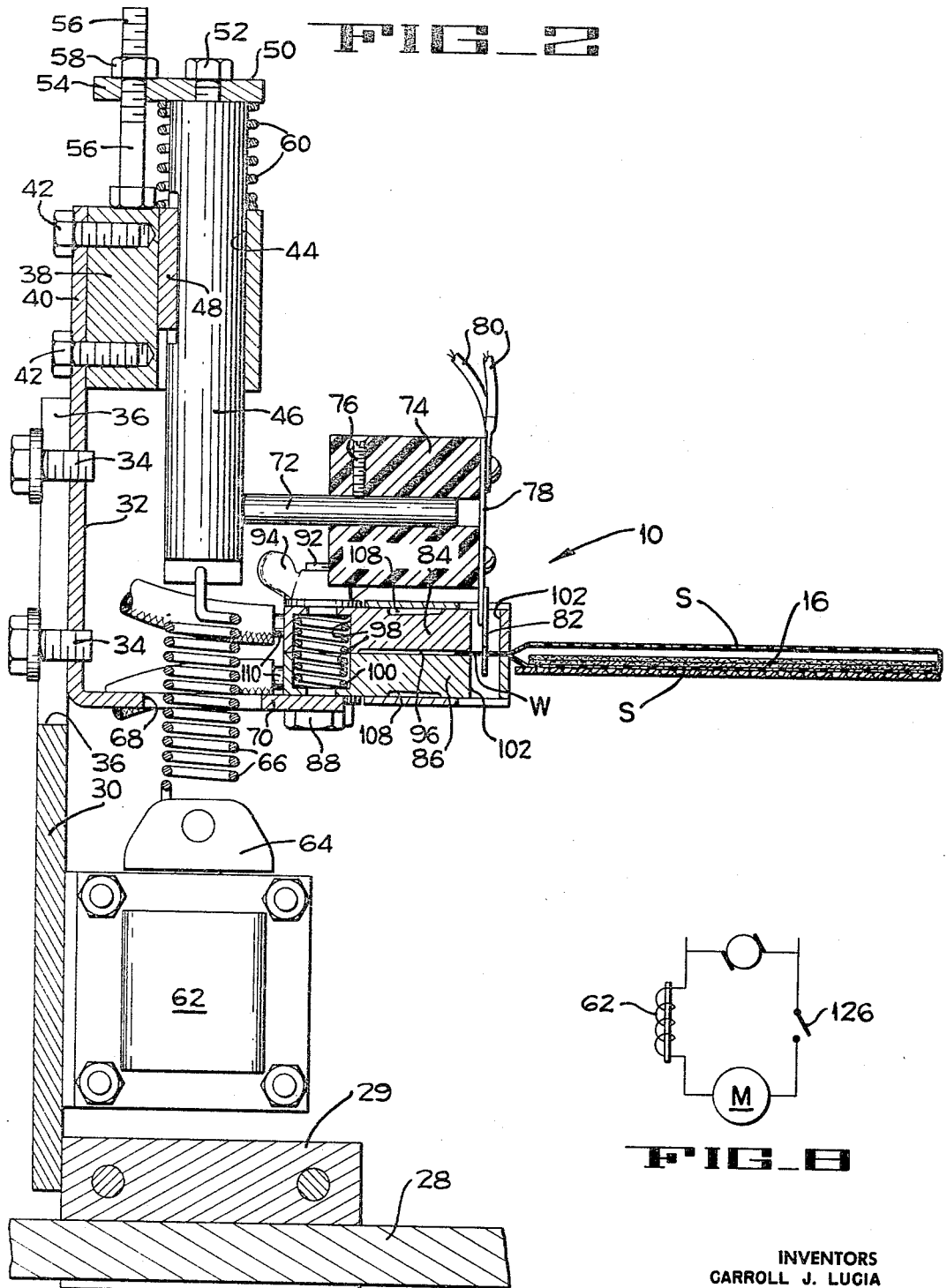

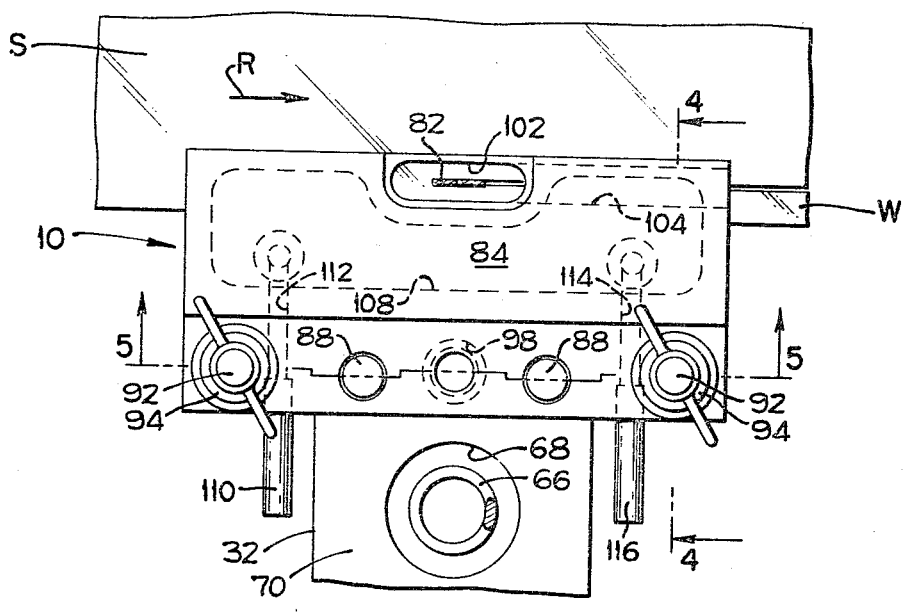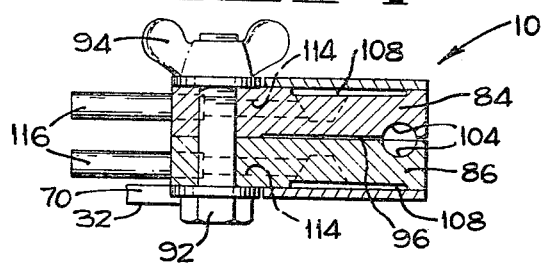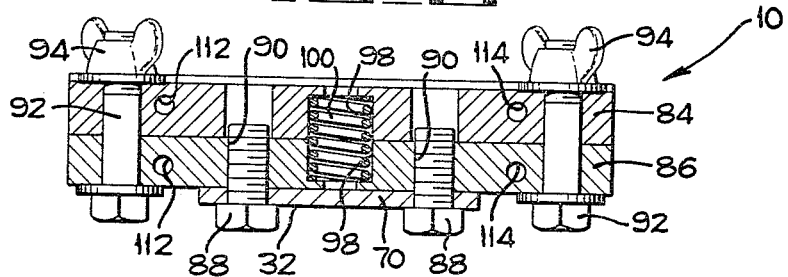

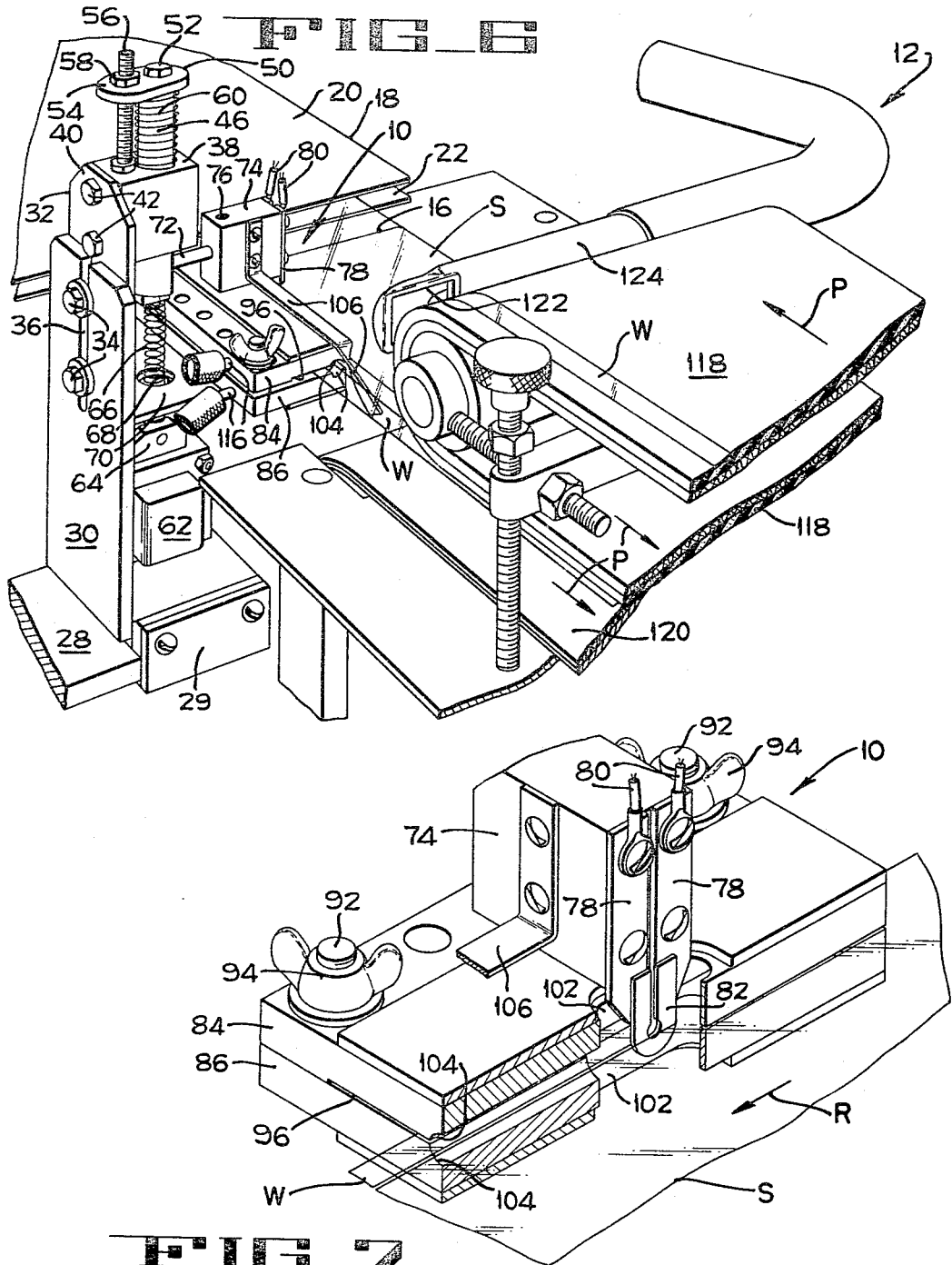

3,320,111
CUTTING AND FUSING APPARATUS
Carroll J. Lucia, Depere, and Raymond J. Sinclair, Green Bay, Wis., assignors to FMC Corporation, San Jose, Calif., a corporation of Delaware
Filed May 14, 1963, Ser. No. 280,353
12 Claims. (Cl. 156—515)

This invention relates to a cutting and fusing apparatus and more particularly to an apparatus for simultaneously cutting and fusing superimposed sheets of thermoplastic material.

An object of this invention is to provide a new and improved apparatus for cutting and fusing thermoplastic material.

Another object of this invention is to provide a new and improved guide member which maintains superimposed sheets of thermoplastic material in a predetermined orientation.

Another object of this invention is to provide new and improved guide blocks that provide freedom of movement for the fused edge of superimposed sheets of thermoplastic material to preclude sticking of the fused edge along the guide blocks.

Another object of this invention is to provide a new and improved guide means for superimposed sheets of thermoplastic material, which are biased away from each other to facilitate location of the superimposed sheets therebetween.

Another object of this invention is to provide a new and improved cutting and fusing apparatus for superimposed sheets of thermoplastic material in which the cutting and fusing element is automatically engageable with and disengageable from the superimposed sheets when relative movement between them and the cutting and fusing element is established and dis-established, respectively.

Another object of this invention is to provide a new and improved cutting and fusing apparatus in which a strip of waste material formed during the cutting and fusing of superimposed thermoplastic sheets is removed to a selected remote location by means operable independently of means which transport the superimposed sheets of thermoplastic material through the machine.

Other objects and advantages of the invention will become apparent from the following description and the drawings in which:

FIGURE 1 is a perspective of a wrapping machine incorporating the cutting and fusing apparatus of the present invention.

FIGURE 2 is an enlarged longitudinal central section of the cutting and fusing apparatus.

FIGURE 3 is a plan of the guide blocks which position the free ends of superimposed thermoplastic material during the cutting and fusing operation.

FIGURE 4 is a section of the guide blocks taken along lines 4—4 of FIGURE 3.

FIGURE 5 is a section of the guide blocks taken along lines 5—5 of FIGURE 3.

FIGURE 6 is an enlarged fragmentary perspective of the cutting and fusing apparatus.

FIGURE 7 is a further enlarged perspective of the guide blocks and the cutting and fusing element with respective portions of the blocks broken away to show an enlarged passageway through which the fused margins of the sheets pass.

FIGURE 8 is an electrical schematic showing an arrangement for controlling the position of the cutting and fusing element of this invention.

The cutting and fusing apparatus 10 of the present invention is cooperatively associated with an automatic wrapping machine 12 (FIG. 1) including a supply conveyor 14 which feeds articles 16, selected for wrapping, toward a former 18. A vertically disposed roll of thermoplastic sheet or web (not shown) is threaded through the former 18 causing the sheet to be folded along its longitudinal median thus resulting in superimposed layers or sheets S (FIG. 2) extending laterally from a longitudinal fold line to the margins of the web which are substantially vertically spaced and laterally aligned. The wrapping machine is of the type disclosed in Patent No. 2,602,276 issued July 8, 1952, to Campbell, to which reference can be had for a complete description of its construction and manner of operation. The web is drawn through the cutting and fusing apparatus 10 and through the wrapping machine 12 by mechanism presently to be explained. The articles 16 are deposited between the superimposed sheets while they move through the former 18, which as shown, includes upper and lower members 20 and 22, respectively, having respective portions thereof located to form a passageway 24 which is disposed to provide an oblique entrance angle for the articles 16 as they are placed between the advancing superimposed sheets S. Once the articles arrive at the former 18 further movement thereof from the left to the right, as viewed in FIGURE 1, is caused by movement of the formed web through the machine.

The free longitudinal edges of the superimposed sheets S of thermoplastic material are slidably received by guide members, hereinafter particularly described, that comprise part of the cutting and fusing head 10. As the free, superimposed marginal regions of the sheets pass through the guide members a vertically extending heated member is located a predetermined distance laterally inwardly from the longitudinal edges of the sheets and intersects the superimposed sheets to effect cutting and fusing of such sheets. As a result of such action a longitudinally fused seam and a strip of waste material are formed. This invention also provides means, particularly described hereinafter, for disposing of the strip of waste material. Within the wrapping machine 12, a transverse fusing and cutting mechanism 26, operable in timed relation to the advance of the article 16 and located in longitudinally spaced relationship to the head 10, forms longitudinally spaced transversely extending seams and cuts the superimposed sheets between adjacent articles thus individually encapsulating the articles 16 between the superimposed sheets.

As shown in FIGURE 2 the support for the cutting and fusing apparatus 10 is secured to a horizontally extending portion 28 of the frame of the machine 12. A bracket 29, secured to the portion 28, has a vertically extending standard 30 secured thereto. A vertically adjustable L-shaped bracket 32 is adjustably secured to the standard 30 by bolts 34 which extend through a vertical slot 36 formed in the bracket 30. The vertical distance of the bracket 32 from the frame portion 28 and the bracket 29 can be varied by loosening the bolts 34 and sliding the bracket 32 in the desired direction. A guide block 38, mounted on the upper end of the vertical leg 40 of the bracket 32 by means of bolts 42 as shown, includes a bore 44 which slidably receives and guides a vertical rod 46. A feather key 48 rigid with the block 38 and slidably received by an elongated slot formed in the rod 46 prevents rotation of the rod 46 in the bore 44 while providing for vertical reciprocatory movement of the rod 46 in the bore 44. The upper end of the rod 46 has a plate 50 secured thereto by a bolt 52. The plate 50 includes a lateral extension 54 which is threaded to receive a bolt 56 and a nut 58 as shown. The head of the bolt 58 is abuttingly engageable with the upper surface of the block 38 to thereby limit the downward movement of the rod 46. A spring 60 extending between the plate 50 and the upper surface of the block 38 is provided for imparting an upward bias to the rod 46. A solenoid 62 is secured to the standard 30 and has its armature 64 connected to the lower end of the rod 46 by a spring 66 which extends through a hole 68 formed in the horizontal leg 70 of the bracket 32. The characteristics of the springs 60 and 66 are chosen so that a greater force is required to stretch the spring 66 over a given distance than the force required to compress the spring 60 over the same distance. The rod is normally retained in its uppermost position. However electrical energization of the solenoid 62 and the consequent downward movement of the armature 64 results in elongation of the spring 66 and compression of the spring 60 until the head of the bolt 56 engages the upper surface of the block 38.

The lower portion of the rod 46 has a transverse bore in which a rod 72 is secured to extend horizontally from the rod 46. A block 74 of dielectric material is secured to the rod 72 by a setscrew 76. A pair of vertically extending laterally spaced, electrically conductive bars 78 (FIG. 7) are secured to the outer vertical face of the block 74, and electrical conductors 80 are secured individually to the bars 78, as shown. A U-shaped resistance element 82 interconnects the lower ends of bars 78 and projects downward therefrom. Electrical energy supplied by the conductors 80 to the bars 78 causes heating of the resistance element 82, the temperature assumed by the resistance element being proportional to the current supplied thereto.

The apparatus for guiding and holding the marginal regions of the superimposed sheets S of thermoplastic material during the cutting and fusing operation comprises similarly shaped upper and lower plates or blocks 84 and 86, respectively, which are operatively mounted below the dielectric block 74 as shown in FIGURES 2, 6 and 7. The lower block 86 is rigidly secured by bolts 88 extending through clearance holes formed in the leg 70 and are threaded into holes 90 formed in the lower block 86. The upper guide block 84 is in turn releasably secured to the lower block by bolts 92 extending through aligned pairs of clearance holes in the upper and lower blocks. Nuts, preferably wing nuts 94, are threaded on the bolts 92 to thereby detachably hold the blocks in abutting engagement as shown in FIGURE 5. A clearance slot 96 extending the entire length of the blocks, is provided for closely slidably receiving the free marginal regions of the superimposed thermoplastic sheets. In order to facilitate the separation of the blocks 84 and 86 during such times when the superimposed sheets are initially positioned in the slot 96 for cutting and fusing, the upper and lower blocks have oppositely directed axially aligned counterbores 98 within which a spring 100 is located. When the wing nuts 94 are tightened to bring the blocks into abutting engagement the spring is under compression thus applying a force tending to separate the blocks. Accordingly, loosening of the wing nuts 94 causes the upper block 84 to be moved upwardly away from the lower lock 86 as a result of the upward biasing force applied by the spring 100.

The guide blocks 84 and 86 are provided with elongated aligned openings 102 extending vertically therethrough within which the cutting and fusing element 82 is selectively operatively positioned as shown in FIGURE 2 during energization of the solenoid 62. It will be noted that the member 82 extends generally normal to the plane defined by the contacting surfaces of the upper and lower blocks 84 and 86 and is of sufficient length to extend above and below such surfaces to achieve its cutting and fusing function. The general plane of the element 82 is parallel to the direction of advance of the sheets S.

During cutting and fusing of the thermoplastic sheets, and for a period of time thereafter, the fused joint remains soft and tacky. Ideally, it is desirable to guard against bringing anything in contact with the fused joint during such a period of time. Accordingly, one of the significant features of this invention provides means whereby the fused joint is prevented from contacting anything during such time when the joint is soft and tacky. To achieve this result the upper and lower blocks 84 and 86, respectively, are provided with adjacent coextensive semicircular openings 104 extending from the opening 102 to the downstream end margins of the blocks as shown in FIGURES 3 and 7. While the superimposed thermoplastic sheets are being cut and fused the lateral marginal regions thereof are positioned in the slot 96 (FIG. 2) with the sheets S moving in the direction indicated by the arrow R as shown in FIGURES 3 and 7. It will be noted that the free lateral edges extend a sufficient distance into the slot 96 so that a waste strip W is trimmed off as a result of the cutting action of the resistance element 82. During the period when the joint is soft and tacky it is necessary to move the strip W laterally away from the sheets S in order to prevent attachment of the adjacent fused seam of the strip W to the fused seam of the sheets. To prevent such attachment a breaker bar 106 (FIG. 6) is provided, having one end formed for securement to the block 74 and the other end twisted to urge the strip W laterally away from the sheets S to thereby effect lateral movement of the waste strip W in the slot 96 immediately following the cutting and fusing action of the resistance element 82.

To further guard against injury to the fused seam this invention provides means for cooling the fused joint so that the time during which the fused joint remains soft and tacky is reduced. For achieving this end the upper and lower blocks 84 and 86, respectively, are provided with fluid tight cavities 108. Cooling fluid, whether gaseous or liquid, is communicated to the cavities 108 by conduits 110, which are, in turn, connected to passageways 112 opening into the respective cavities 108. The temperature difference between the blocks 84 and 86 and the cooling fluid, with the blocks having a higher temperature, causes heating of the cooling fluid before it is discharged to discharge passageways 114 which are in communication with discharge conduits 116. In this manner the guide blocks are in part cooled by the fluid and as a consequence the fused seam hardens more quickly, thus further precluding damage thereto.

Since the packaging machine 12 effects wrapping of the articles 16 by using a relatively continuous sheet of thermoplastic material, a continuous waste strip W is formed. The width of this strip W is defined by the margins of the folded web and the location of the resistance element 82 when the web is operatively positioned between the guide blocks 84 and 86, as shown in FIGURE 2. Means operable independently of the progress of the web through the machine are provided for disposing of the waste strip to any desired location. More particularly, a friction drive comprising upper and lower driven belts 118 and 120 (FIG. 6) driven in the direction indicated by the arrows P, are provided to frictionally engage between the lower and upper portions of their orbits, respectively, the superimposed sheets of thermoplastic material. The friction drive is located downstream from the cutting and fusing apparatus 10 in order to draw the thermoplastic sheets through the cutting and fusing apparatus 10 and to feed the thermoplastic sheets to the transverse fusing and cutting mechanism 26. The waste strip W is also engaged for feeding between the belts 118 and 120 but it it trained about the downstream roller (not shown) and directed to overlie the upper portion of the orbit of the upper belt 118 to be received into the open end 122 of a vacuum conduit 124 which removes the waste strip W to the desired remote location. It is to be appreciated that the vacuum conduit 124 can be positioned adjacent the downstream side of the cutting and fusing apparatus 10 to thus remove the strip W immediately after it is formed thus precluding the necessity of directing the waste strip around the upper belt 118.

In accordance with certain of the objects of this invention means are provided for deenergizing the solenoid 62 so that the cutting and fusing resistance element 82 is retracted upwardly by the bias imposed by the spring 60 to thus position the element 82 upwardly away from the superimposed thermoplastic sheets whenever movement of the sheets through the machine is interrupted. One way in which this can be accomplished is by means of the electrical circuit shown schematically in FIG. 8, which electrically energizes both the solenoid 62 and the driving motor M for the feed belts 118 and 120. A selectively operable switch 126 connected between the supply of electrical energy and the motor M effects energization of the motor M and the solenoid 62 when closed and conversely deenergizes the motor and the solenoid 62 when open. Therefore, at the instant movement of the sheets of thermoplastic material through the machine is interrupted due to the deenergization of the motor M the solenoid 62 is deenergized causing the resistance element 82 to move upwardly to an inoperative position.

The operation of the apparatus will be described assuming the sheet of thermoplastic material to have been threaded through the machine. The supply conveyor 14 moves the longitudinally spaced articles 16 toward the passageway 24 of the former 18, where the articles 16 are successively entered between the superimposed sheets of thermoplastic material. From this point further progress of the articles through the machine is effected by the movement of the folded web, now folded into superimposed sheets S, through the machine. The free marginal regions of the sheets S are operatively positioned between the blocks 84 and 86 and the cutting and fusing element 82 is in the position shown in FIGURE 2. With the resistance element 82 being heated to its predetermined temperature, passage of the sheets S past the cutting and fusing apparatus 10 causes the free marginal regions of the sheets S positioned between the blocks 84 and 86 to be cut and fused with the waste strip W resulting from such action. Orbital movement of the belts 118 and 120, which are frictionally engaged with the upper and lower sheets S, effects transport of the sheets and the articles enclosed therein to the transverse fusing and cutting mechanism 26. Simultaneously therewith the waste strip W which is also frictionally engaged by the belts 118 and 120 is directed over the upper belt 118 to the end 122 of the vacuum conduit 124, directing the waste strip to the desired remote location for disposal. Passage of the sheets S and articles through the mechanism 26 completes encapsulation of the articles 16 since the mechanism 26 cuts and fuses the superimposed plastic sheets intermediate the spaced articles.

At any time when the machine is rendered inoperative by opening the switch 126 the motor M and the solenoid 62 are both deenergized. Deenergization of the solenoid 62 causes the spring 60 to bias the rod 46 upwardly and correspondingly the resistance element 82 is moved upwardly out of contact with the sheets S. By correlating the elements in the above described manner, excessive burring of the web W and consequent sticking of the thermoplastic material to the guide plates 84 and 86 is prevented. Restarting of the machine is therefore facilitated.

While a preferred apparatus for carrying out the invention has been shown and described, it will be understood that it is capable of modification and variation while still employing the principles of the invention. It is also to be understood, therefore, that the scope of the invention should be limited only by the scope and proper interpretation of the claims appended hereto.

Having thus described the invention, that which is believed to be new and for which protection by Letters Patent is desired is:

1. An apparatus for cutting and fusing superimposed continuous thermoplastic sheets comprising means for moving such sheets along a predetermined longitudinal path, guide means defining an elongated passageway for slidably receiving selected longitudinal marginal regions of such sheets, a heated cutting and fusing means extending across said passageway and intersecting such selected marginal regions, and means for moving said cutting and fusing means out of intersecting relation with such selected marginal regions when said moving means is rendered inactive.

2. An apparatus for fusing superimposed continuous layers of thermoplastic sheets comprising means for moving such sheets along a predetermined longitudinal path, cooperable closely adjacent plates defining an elongated passageway for slidably receiving selected longitudinal marginal regions of such sheets, heated cutting and fusing means extending across said passageway and intersecting such selected marginal regions to form a fused seam interconnecting the sheets, and means for moving said fusing means out of intersecting relation with such selected marginal regions when said moving means is rendered inactive, said elongated passageway having a portion thereof enlarged for preventing contact of the fused seam with said plates.

3. An apparatus for cutting and fusing superimposed continuous layers of thermoplastic sheets comprising means for moving such sheets along a predetermined longitudinal path, cooperable closely adjacent upper and lower plates defining an elongated passageway for slidably receiving selected longitudinal marginal regions of such sheets, heating cutting and fusing means extending transversely through said passageway to intersect such selected marginal regions, said plates having vertically extending and aligned apertures normal to said elongated passageway for operatively receiving said cutting and fusing means, and selectively operable means for locating said cutting and fusing means in said apertures.

4. The apparatus of claim 3 including means between said plates for imparting a biasing force tending to separate said plates from their closely adjacent position in order to facilitate location of such sheets therebetween.

5. An apparatus for cutting and fusing superimposed continuous layers of thermoplastic sheets comprising means for moving such sheets along a predetermined substantially rectilinear path, guide means defining an elongated passageway for slidably receiving selected longitudinal marginal regions of such sheets, heated cutting and fusing means extending across said passageway and intersecting such selected marginal regions laterally inwardly from the edges thereof for fusing such sheets together and for forming a waste strip, means for moving said cutting and fusing means out of intersecting relation with such selected marginal regions when said moving means is rendered inactive, and meanns operable independently of said moving means for disposing of such a waste strip.

6. The apparatus of claim 5 wherein said last mentioned means includes a vacuum conduit within which said waste strip is entrained to effect disposition thereof.

7. An apparatus for cutting and fusing superimposed continuous layers layers of thermoplastic sheets comprising means for moving such sheets along a predetermined longitudinal path, guide means defining an elongated passageway for slidably receiving selected longitudinal marginal regions of such sheets, heated cutting and fusing means extending across said passageway and intersecting such selected marginal regions for joining such sheets in a fused seam and for forming a waste strip, means for moving said cutting and fusing means out of intersecting relation with such selected marginal regions when said moving means is rendered inactive, and means located between the fused joint and the waste strip for directing the waste strip laterally away from the fused seam.

8. The apparatus of claim 7 which further comprises a vacuum conduit for entraining and removing such waste strip to a desired location.

9. An apparatus for cutting and fusing edges of superimposed movable sheets of thermoplastic material, comprising means for supporting such sheets to cause rectilinear movement thereof in a substantially horizontal plane, guide means including superimposed members providing a slot of sufficient width to closely slidably receive such edges without interfering with such rectilinear movement thereof, and a heated cutting and fusing member movably located in said guide means to extend across said slot so that engagement thereof with the sheets is effected, said superimposed members having cooperating recesses therein extending from said cutting and fusing member to the downstream margin of said superimposed members to accommodate lateral separation of a resulting strip of excess material.

10. The apparatus of claim 9 wherein a vacuum conduit is provided for disposing of the strip of excess material.

11. An apparatus for cutting and fusing edge regions of superimposed movable sheets of thermoplastic material, comprising means for supporting such sheets in a substantially horizontal plane, guide means including superimposed planar members providing a slot therethrough of sufficient width to closely slidably receive such edge regions, a heated cutting and fusing member movably located in cooperable openings formed in said guide means to extend across said slot so that engagement thereof with such edge regions is effected to join the sheets in a fused seam, said planar members having opposed and communicating recesses therein extending from said cooperable openings to the downstream margin of said planar members to accommodate lateral separation of a resulting strip of excess material and preclude contact of the fused seam with said guide means, and an elongate bar having a part thereof operative to direct the strip of excess material away from the fused seam.

12. An apparatus for cutting and fusing edge regions of superimposed sheets of thermoplastic material, comprising means for supporting such sheets in a substantially horizontal plane, cooperable planar guide means providing a slot extending the length thereof of sufficient width to closely slidably receive such edge regions means for moving the sheets through the apparatus, a heated cutting and fusing member selectively locatable in said guide means to extend across said slot to engage the sheets for forming a welded seam therein and a strip of waste material, cooperating recesses in said guide means initiating from said cutting and fusing member and extending to the downstream margin of the guide means, a vacuum conduit operable independently of said moving means for disposing of the strip of waste material, and means for precluding contact between the welded seam and the strip of waste material.

References Cited by the Examiner
UNITED STATES PATENTS

| | | | |
|---|---|---|---|
| 2,251,282 | 8/1941 | Huizeng | 83—433 |
| 2,596,400 | 5/1952 | Hill | 83—433 |
| 2,711,780 | 6/1955 | Hakomaki | 156—515 |
| 3,156,149 | 11/1964 | Frizelle | 83—43 |

EARL M. BERGERT, *Primary Examiner.*

D. J. DRUMMOND, *Assistant Examiner.*